United States Patent
Genreith et al.

[11] Patent Number: 5,116,022
[45] Date of Patent: May 26, 1992

[54] STOP VALVE FOR PIPE BRIDGE

[75] Inventors: Hans Genreith; Norbert Marx, both of Düren; Günter Nägler, Eschweiler, all of Fed. Rep. of Germany

[73] Assignee: Zimmermann & Jansen GmbH, Düren, Fed. Rep. of Germany

[21] Appl. No.: 679,783

[22] Filed: Apr. 3, 1991

[30] Foreign Application Priority Data

Apr. 6, 1990 [DE] Fed. Rep. of Germany ....... 4011274

[51] Int. Cl.$^5$ .............................................. F16K 3/18
[52] U.S. Cl. .................................... 251/175; 251/196
[58] Field of Search ................................ 251/175, 196

[56] References Cited

U.S. PATENT DOCUMENTS 2,306,490 12/1942 Doble .............................. 251/196 X
2,705,610 4/1955 Hjulian ........................... 251/196 X Primary Examiner—John C. Fox
Attorney, Agent, or Firm—Lorusso & Loud

[57] ABSTRACT

A double disk wedge valve the valve disk of which is movable by an actuating rod and is provided with a pipe bridge which includes two sealing rings connected by way of a compensator, said sealing rings in the open position of the valve being urged by elastic bias against the sealing seats of the valve housing, wherein said compensator comprises an inner pipe section and an outer pipe section extending in coaxial relationship therewith. The outer pipe section is fixedly joined, especially welded, to both sealing rings. Also, it has a circumferentially extending indentation. The inner pipe section is fixedly joined to only one of said two sealing rings while it is axially movable relative to the other one. Within the valve housing a gas pressure can be set which is higher than the pressure in the valve passageway in the open position of the valve.

9 Claims, 2 Drawing Sheets

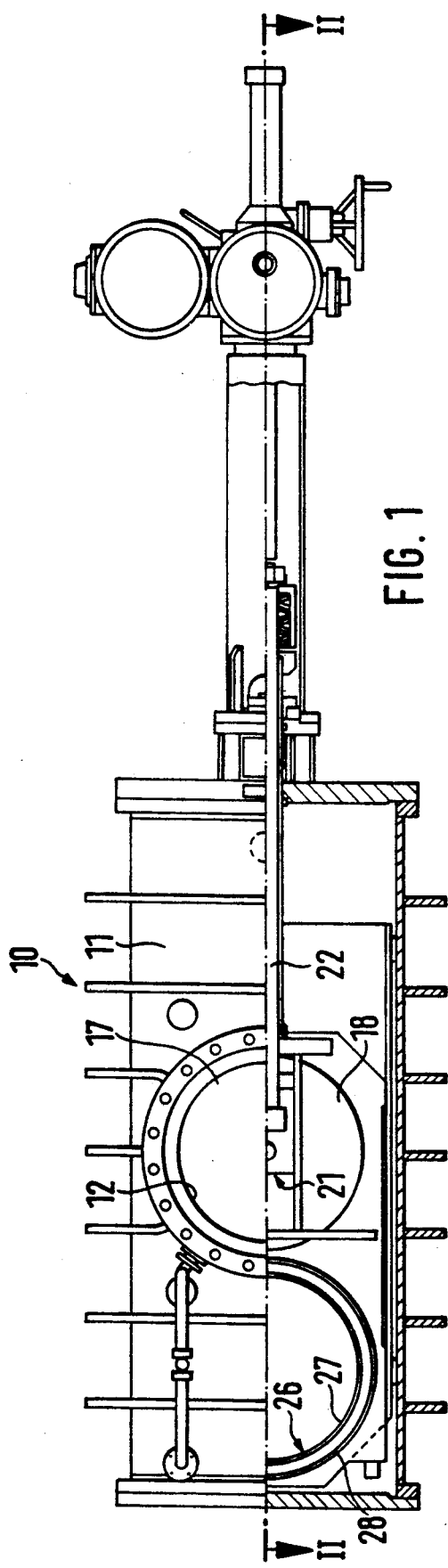
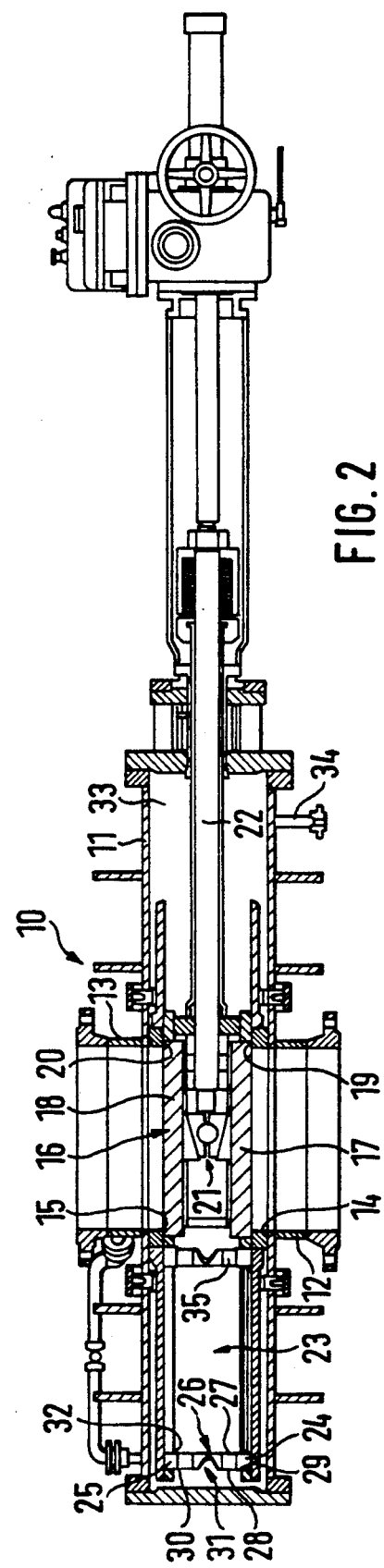

STOP VALVE FOR PIPE BRIDGE

The present invention is directed to a stop valve for a pipe bridge as specified in the preamble of claim 1. Stop valves of this kind are generally known and have been manufactured and sold by the applicant for many years (cf. applicant's pamphlet No. 300, II/82 entitled "Armaturen und Einrichtungen für Prozesse in Raffinerien, Petrochemie, Chemie-Programm III", and DE-U-80 08 316). Plain, oval-body and round-body stop valves for pipe bridges are known both as single disk and as double disk wedge valves (wedge-in-wedge principle) with rising stem and a straight, tubular passage in the open position. The present case is concerned with the further development of a stop valve for a pipe bridge configured as a double disk wedge valve. Such double disk wedge valves are employed when sealing of the flow space of the valve relative to the remaining housing interior is required in the open position of the valve. This is the case particularly when a gas stream comprising contaminants of subliming substances is concerned, because otherwise these substances will deposit in non-enclosed housing portions and may result in total clogging whereby operation of the valve may become impossible. Furthermore, such valves are employed for similar reasons in the case of dust-laden gases and also of highly contaminated liquid media, for instance in coal gasification plants, incinerating plants, chemical plants, pipelines or the like.

DE-C-868,543 discloses a double disk wedge valve the pipe bridge of which is composed of an elastic corrugated pipe with mechanical seals and sealing rings disposed at the end faces. The pipe bridge is accommodated in a tubular housing portion of the valve disk, said housing simultaneously serving to hold and guide the pipe bridge. In the valve open position the mechanical seals are pressed against the sealing faces of the housing due to the elasticity of the corrugated pipe and the expanding effect of a wedge device. This known construction exhibits the drawback that the bias of the elastic corrugated pipe must be set at a relatively large value so that sufficient tightness is achieved. Consequently, when the pipe bridge is displaced its sealing rings slide along the opposite sealing seats of the valve housing with a relatively high contact pressure. Thereby, considerable friction is produced between the interengaged sealing faces so that considerable actuating forces are required to switch the valve. In order to avoid these drawbacks it is proposed in DE-U-80 08 316 that the sealing rings of the pipe bridge should be suspended from an extension of the actuating rod for the valve disk and provided with a restoring means comprising rollers which are mounted on the sealing rings and run along actuating ledges mounted in the housing and having lead-in grooves for the rollers disposed in the vicinity of the valve passageway. This combined expanding and releasing means is intended to ensure, on the one hand, reliable urging of the sealing rings in the open position of the valve and, on the other hand, free movability of the pipe bridge along the two sealing seats of the housing upon actuation of the valve. Additionally, it is proposed that the shut-off plates of the valve disk are also provided with rollers which in the closed position run into the lead-in grooves of the actuating ledges so that, particularly in case of high differential pressures, a displacement of the shut-off plates becomes possible with minimum friction and without any damage to the sealing surfaces. Concretely, the pipe bridge is composed of two sealing rings and a compensator which interconnects the sealing rings. The sealing rings are dimensioned so that their diameters are in conformity with the diameter of the sealing seats of the housing. The compensator is an elastic sheet-metal ring bent to corrugated shape which is mounted in such a way that any dirt deposits will come off automatically when the compensator is either compressed or expanded. In the open position of the valve the sealing rings are expanded by means of a wedge device which comprises two housing portions which are disposed fixedly and laterally in the valve housing and which in the open position of the valve cooperate with two respective disk wedges mounted on the sealing rings. The pipe bridge also comprises a restoring device respectively including four rollers which are mounted sideways and in pairs on the sealing rings in symmetry with the centre axis thereof. The rollers run along four actuating ledges disposed in the valve housing and provided with lead-in grooves for the rollers in the vicinity of the valve passageway. Each of the shut-off plates also includes four rollers running on the afore-mentioned actuating ledges. The width between the actuating ledges and the depth of the lead-in grooves are dimensioned so that both the shut-off plates and the sealing rings of the pipe bridge are pressed in gas-tight fashion against the sealing seats of the housing in the closed position and in the open position of the valve by the inner wedge and the housing wedges, respectively, whereas in any switching position other than these they are guided at a distance from the sealing seats of the housing. It will be apparent from the above description of the known design that it is a relatively complex one. Many individual components must be matched with each other as regards their flow of motion. Therefore extreme accuracy is required in the manufacture of the known double disk wedge valve with pipe bridge. Furthermore, the known design comprises a large number of wearing parts and of parts which must be separately cleaned after a predetermined operating period. To summarize: with the known double disk wedge valve with pipe bridge according to DE-U-80 06 316 mechanical means (wedge mechanism, roller, lead-in grooves, actuating ledges) and mechanical forced control are used either to press the sealing rings against the sealing seats of the valve housing or to lift them off depending on the position of the valve. The afore-mentioned forced mechanism precludes any matching with changed external conditions, especially with different pressures inside the pipeline in which the valve is installed. Furthermore the known double disk wedge valve design—as already explained above—requires a large number of components which must be matched with each other in respect of the flow of motion, resulting in a high consumption of material as well as labour for manufacture and assembly. Maintenance is correspondingly expensive.

The instant invention is based on the object of further improving a double disk wedge valve of the specified kind so that an invariably high tightness between the sealing rings of the pipe bridge and the cooperating sealing seats of the valve housing is ensured in the open position of the valve while the number of parts is reduced, and at the same time good matching with changed external conditions, particularly with varying pressures in the valve passageway, is made possible.

In accordance with the invention the specified object is achieved by the characterizing features of claim 1. In accordance with the structure of the present invention the gas pressure within the valve housing is set to be higher than the gas pressure in the pipeline or in the valve passageway, respectively. This pressure acts on the circumferential indentation such that the sealing rings of the pipe bridge are urged against the cooperating sealing seats while the valve housing is correspondingly sealed relative to the valve passageway or the pipeline in the open position of the valve. The pressure in the valve housing is set in accordance with the pressure prevailing in the valve passageway. It is preferred to use scavenging steam as the pressurized medium, which is in any case provided for cleaning the valve. Due to the fact that the valve housing is at an increased scavenging steam pressure relative to the valve passageway or the pipeline, respectively, any deposition in the valve housing of dirt or other gaseous or liquid media flowing through the pipeline will be either prevented or minimized. Accordingly, the consumption of scavenging steam for cleaning purposes is minimum in the construction according to the present invention. The above-mentioned adjustment of pressure within the valve housing also ensures high fluid-tightness at any time between pipe bridge and valve housing in the open position of the valve while no excessive frictional forces need be overcome upon actuation of the valve, which is due to the fact that the axial expansion of the sealing rings by the gas pressure with the valve housing can be matched with external conditions, especially the pressure inside the pipeline or inside the valve passageway, respectively. The sealing action of the compensator according to the present invention may be enhanced by a compensator bias if this is suitable for any specific use of the valve.

Advantageous details of the valve design according to the invention are described in the subclaims to which reference shall herewith be made.

Below, an embodiment of a double disk wedge valve with pipe bridge in accordance with the instant invention will be described in detail with reference to the accompanying drawing, in which:

FIG. 1 is a partial view of a double disk wedge valve with pipe bridge, wherein the housing wall is partly broken away;

FIG. 2 is a sectional view along the line II—II of FIG. 1 showing the double disk wedge valve of FIG. 1.

Figure 3:
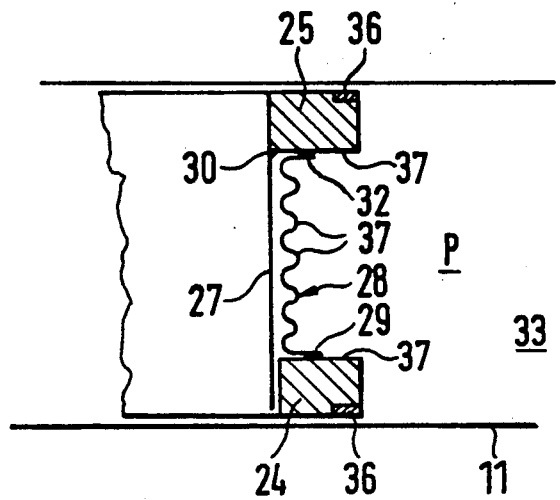
FIGS. 3 and 4 are schematic partial sectional views of modifications of the invention.

The double disk wedge valve 10 illustrated in FIGS. 1 and 2 comprises a valve housing 11 including two pipe sockets 12 and 13 and two sealing surfaces 14 and 15 of the housing between which a valve disk 16 is movable which consists of two shut-off plates 17 and 18 with sealing rings 19, 20. The two shut-off plates 17 and 18 are adapted to be urged against the sealing surfaces 14 and 15 of the housing by means of an interior wedge 21 acting as an expanding member, which is mounted on the end of an actuating rod 22 and is fixedly connected thereto. The shut-off plates 17 and 18 can be expanded by the interior wedge 21 as known per se in accordance with the so-called "wedge-in-wedge principle". Beneath or adjacent the valve disk 16 there is disposed a pipe bridge 23 which is composed of two sealing rings 24, 25 and a compensator 26 connecting the sealing rings with each other. The compensator 26 is composed of an inner pipe section 27 and a coaxially extending outer pipe section 28, the outer pipe section 28 being fixedly joined as by welding (annular welds 29, 30) to the two sealing rings 24, 25 and being formed with a circumferentially extending indentation 31. On the other hand, the inner pipe section 27 is a hollow cylinder, i.e. it has no indentation, so that no loss of flow will be caused thereby. Furthermore, the inner pipe section is fixedly joined (annular weld 32) to only one of the two sealing rings, i.e. the sealing ring 25. The inner pipe section 27 is axially movable relative to the other sealing ring 24, the axial play between the sealing ring 24 and the inner pipe section 27 being about 1.0 mm to about 5.0 mm. The arrangement of the inner pipe section 27 relative to the two sealing rings 24 and 25 is such that the inner surface of the pipe section 27 is respectively aligned with the inner faces of the sealing rings 24 and 25 so that in the open position of the valve a practically uninterrupted flow passageway is provided. In FIGS. 1 and 2 the valve is illustrated in the closed position. The valve housing 11 is outwardly fluid-tight so that within the valve housing or in the interior 33 thereof a gas pressure may be set which is higher than the pressure in the valve passageway or, respectively, in the pipeline (not illustrated in FIGS. 1 and 2) in the open position of the valve. Hence, the actuating rod 22 must also be introduced in fluid-tight fashion into the valve housing 11. A fitting 34 for communication with a source of pressurized gas (not illustrated), especially a source of scavenging steam, is provided on the valve housing 11. With the embodiment illustrated in FIGS. 1 and 2 the sealing surfaces of the sealing rings 24, 25, on the one hand, and the sealing surfaces 14, 15 of the housing, on the other hand, are configured to extend respectively in parallel to the actuating direction of the valve and are hardened or armoured as is known per se so as to enhance their wear resistance.

Further, the circumferential indentation 31 of the outer pipe section 28 extends almost right to the outer surface of the inner pipe section 27 so that the gas pressure prevailing in the housing interior 33 is fully effective via the circumferential indentation 31 against the sealing rings 24, 25 whereby the same are axially expanded. The axial expansion of the sealing rings 24, 25 is enabled, on the one hand, by the circumferential indentation 31 and, on the other hand, by the axial play between the inner pipe section 27 and one of the two sealing rings, in this case the sealing ring 24. Accordingly, the pipe bridge 23 is delimited by the two sealing rings 24, 25, on the one hand, and by the inner and outer pipe sections 27, 28 serving as a compensator 26, on the other hand, whereby an annular box 35 is formed. This annular box 35 or the annular space between inner and outer pipe sections 27 and 28 is filled with a thermal insulation material, especially glass wool, rock wool or the like. This filler material has not only the purpose of providing thermal insulation but also of preventing the ingress of flow medium into the specified annular space defined between inner and outer pipe sections. Clogging of the annular space by flow medium or, in the case of a gaseous flow, by dust or dirt particles or similar deposits would, after prolonged operation, greatly affect the action of the compensator 26, so that the above-mentioned filler material has a dual function.

All other structural details of the double disk wedge valve illustrated in FIGS. 1 and 2 being known per se, any further description of these parts will be omitted all the more as said parts in any case do not form part of the instant inventive concept.

Basically, it is however conceivable that an adjustable pressure limiting valve is provided to cooperate with the valve housing 11 or the interior space 33 thereof so that a predetermined pressure in the interior 33 of the valve housing 11 will not be exceeded, said pressure being set such that a sufficiently tight, reliable seal is ensured between the sealing rings 24, 25 and the cooperating sealing seats 14, 15 of the valve housing in the open position of the valve.

Further, it should be noted in respect of the illustrated embodiment that in practical use a somewhat lower pressure will exist in the annular space between inner and outer pipe sections than in the valve passageway or in the pipeline, this phenomenon being caused by the restriction in the area of axial play between the sealing ring 24 and the inner pipe section 27 and/or, in case of a somewhat higher flow rate, in the valve passageway or the pipeline, respectively, which is caused by the resulting "water pumping effect". Consequently, the positive pressure prevailing in the interior 33 of the valve housing 11 may act with enhanced effect on the two sealing rings 24, 25 whereby they are expanded in axial direction.

Figure 4:
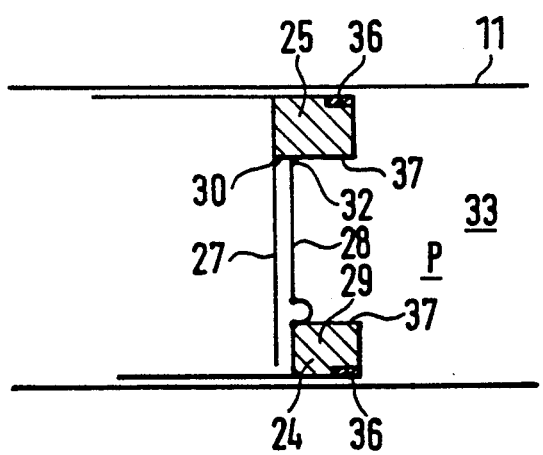

In FIGS. 3 and 4, modifications of the invention according to claim 7 are shown as schematic partial sections, wherein 27 respectively is the inner pipe section, 28 is the outer pipe section, 24, 25 are the two sealing rings, 33 is the interior of the valve housing 11 which is at a positive gas pressure, 36 are annular inserts of armour steel or the like, and 29, 30, 32 are annular welds. The surfaces of sealing rings and outer pipe section which face each other axially on the side of the valve housing (FIG. 3) are indicated at 37. At a positive pressure in the valve housing 33 they are operative to cause axial expansion of the outer pipe section 28 while sealing takes place in the vicinity of the annular inserts 36. In the embodiment illustrated in FIG. 4, the sealing connection between the smooth outer pipe section and the lower sealing ring 24 is effected via an annular ring which permits a relative axial movement between the two sealing rings 24, 25 under the above-described conditions.

All of the features disclosed in the present application papers are claimed as being essential to the invention to the extent to which they are novel over the prior art either individually or in combination.

We claim:

1. A double disk wedge valve comprising:
a valve housing;
a valve disk disposed within said valve housing which is movable by an actuating rod and which is provided with a pipe bridge, said pipe bridge comprising two sealing rings connected by way of a compensator, said sealing rings being urged by elastic bias against two sealing seats disposed on said valve housing when said valve is in an open position, said compensator comprising a corrugated pipe section and having a circumferentially extending indentation, wherein said corrugated pipe section extends as an outer pipe section coaxially over an inner pipe section having an inner surface and an outer surface which forms an annular space, said inner pipe section being fixedly joined to only one of said two sealing rings, and that within said valve housing a gas pressure can be set which is higher than pressure in the valve passageway when the valve is in said open position.

2. The valve as in claim 1, wherein said annular space between said inner and outer pipe sections is filled with a thermal insulating material, especially glass wool, rock wool of the like.

3. The valve as in claim 1, wherein said actuating rod is inserted into said valve housing in fluid-tight fashion, and said valve housing is provided with a fitting for communication with a source of pressurized gas, especially a source of scavenging steam.

4. The valve as in claim 1, wherein sealing surfaces of said sealing rings and sealing surfaces of said sealing seats of said valve housing each extend parallel to the valve actuating direction or, respectively, normal to the longitudinal axis of the valve passageway.

5. The valve as in claim 1, wherein said circumferentially extending indentation of said outer pipe section extends close to said outer surface of said inner pipe section.

6. The valve as in claim 1, wherein said pipe bridge is delimited by said two sealing rings and by said inner and outer pipe sections disposed therebetween and acting as said compensator, said inner surface of said inner pipe section being in alignment or flush with the inner surfaces of said two sealing rings.

7. The valve as in claim 1, wherein said outer pipe section has a circumferentially extending indentation.

8. The valve as in claim 1, wherein sealing surfaces of said two sealing rings are each formed or operate along outer peripheries thereof.

9. The valve as in claim 8 wherein sealing surfaces of said sealing rings comprise annular inserts extending along outer peripheries thereof and are made of hardened steel, especially armour steel.

* * * * *